(12) United States Patent
Meyer et al.

(10) Patent No.: US 12,485,942 B1
(45) Date of Patent: Dec. 2, 2025

(54) HAND TRUCK

(71) Applicant: Cyli Cart, LLC, Bakersfield, CA (US)

(72) Inventors: Jan Meyer, Bakersfield, CA (US);
Kevin Russell, Bakersfield, CA (US)

(73) Assignee: Cyli Cart, LLC, Bakersfield, CA (US)

( * ) Notice: Subject to any disclaimer, the term of this patent is extended or adjusted under 35 U.S.C. 154(b) by 0 days.

(21) Appl. No.: 19/169,396

(22) Filed: Apr. 3, 2025

(51) Int. Cl.
*B62B 1/06* (2006.01)
*B62B 1/08* (2006.01)
*B62B 1/26* (2006.01)
*H01F 7/04* (2006.01)

(52) U.S. Cl.
CPC ............... *B62B 1/08* (2013.01); *B62B 1/06* (2013.01); *B62B 1/264* (2013.01); *B62B 2203/30* (2013.01)

(58) Field of Classification Search
CPC .. B62B 1/06; B62B 1/08; B62B 1/264; H01F 7/04
See application file for complete search history.

(56) References Cited

U.S. PATENT DOCUMENTS

| | | |
|---|---|---|
| 2,477,294 A | 7/1949 | Fuller |
| 2,612,386 A | 9/1952 | Schutzer et al. |
| 2,654,493 A | 10/1953 | Kernkamp |
| 3,850,441 A | 11/1974 | Peters et al. |
| 4,762,333 A | 8/1988 | Mortenson |
| 5,304,136 A * | 4/1994 | Erskine ............. A61M 25/0631 604/110 |
| 5,340,136 A | 8/1994 | MacNeil et al. |
| 5,419,569 A | 5/1995 | Walla |
| 5,445,399 A | 8/1995 | Salvucci, Sr. |
| 5,833,249 A | 11/1998 | DeMartino |
| 6,707,360 B2 * | 3/2004 | Underwood ......... B23Q 3/1546 269/8 |
| 7,273,216 B1 * | 9/2007 | Hohrman ................ B62B 1/264 280/79.5 |

FOREIGN PATENT DOCUMENTS

KR 20080098705 A * 11/2008 ............... H01H 3/46
KR 101683231 12/2016

* cited by examiner

*Primary Examiner* — Bryan A Evans
(74) *Attorney, Agent, or Firm* — James M. Duncan; Young Wooldridge LLP

(57) ABSTRACT

A hand truck utilizes a pair of permanent magnet unit to secure two metallic cylindrical objects to the hand truck. Each permanent magnet unit has a forward-facing clamping surface for engaging a side of a metallic cylindrical object. Each permanent magnet provides a selective magnetic field sufficient to secure the metallic cylindrical object to the forward-facing clamping surface of the permanent magnet. The pair of permanent magnet units may be simultaneously actuated by operation of a single actuation handle. The hand truck may be equipped with a pair of cylinder safety mechanisms by which an operator may selectively engage a safety plate beneath each of the metallic cylindrical objects. Each safety plate is independently rotatable by the operator thereby allowing each metallic cylindrical object to be separately released from the hand truck.

12 Claims, 17 Drawing Sheets

HAND TRUCK

BACKGROUND OF THE INVENTION

The present invention is a hand truck which secures metallic cylindrical objects for both maintaining the cylindrical object in a standing position and for transporting the metallic cylindrical object. Such metallic cylindrical objects may be very heavy, bulky, and awkward to handle with the known manually operated devices. The types of metallic cylindrical objects which may be secured and/or transported by the present invention include metallic cylindrical tanks which hold gas and liquids, including tanks which hold gases, where the gases have various applications such as welding, formulation of compositions, and other industrial applications. Such metallic cylindrical objects may also include artillery rounds, pipe segments, and similar objects which are cylindrical in shape, generally heavy and awkward to handle. The present invention is utilized to support and/or move a pair of such metallic cylindrical objects which are disposed in a side-by-side configuration on the hand truck.

By way of example, tanks utilized for storing and transporting compressed gas are routinely transported in various industrial facilities for use by welders. Regulations of the Occupational Safety and Health Administration require that compressed gas cylinders shall be stored in an upright (i.e., vertical) position.

Maneuvering cylindrical objects presents difficulties. Many times, cylindrical tanks are moved by an individual by tilting the tank such that a small edge of the bottom of the tank engages the ground surface, and then "rolling" the tank along that edge, with the tank precariously leaning off vertical. When this method is employed, it is not uncommon for the tank to tilt too far and fall to the ground, presenting a hazard to personnel and to equipment.

Such cylindrical objects may also be transported by a variety of known hand trucks. Such hand trucks typically have straps or the like for maintaining the cylindrical objects in attachment to the hand truck, thereby retaining the objects in a standing position for storage or for transporting the metallic cylindrical objects along the ground or upon a floor surface. The straps typically require a latch or tightening mechanism to adequately secure the cylindrical objects. However, until the cylindrical objects have been secured to the framework of the hand truck by the latch or tightening mechanism, there is a risk of the cylindrical objects falling thereby creating a risk of injury to personnel or property. It is therefore important that the cylindrical objects be secured to the hand truck with a simple, fast, and effective mechanism.

SUMMARY OF THE INVENTION

Embodiments of the present invention are a hand truck which provides a solution to the above identified need. An embodiment of the presently disclosed hand truck has a left-side rail member having a left-side axle support member, a right-side rail member having a right-side axle support member, where the left-side rail member and right-side rail member are disposed in a parallel configuration. A left-side wheel is attached to a left-side axle extending from the left-side axle support member and a right-side wheel is attached to a right-side axle extending from the right-side axle support member. An upper cargo support bracket spans between the left-side rail member and the right-side rail member, and a lower cargo support bracket spans between the left-side rail member and the right-side rail member. A magnet support bracket extends backwardly from the left-side rail member and the right-side rail member, and spans between the two members.

The mechanism utilized to secure the pair of metallic cylindrical objects to the cart utilizes a pair of permanent magnet units. The pair of permanent magnet units, referred to herein as the "first permanent magnet unit" and the "second permanent magnet unit", are attached to the magnet support bracket. Each of the permanent magnet units has a forward-facing clamping surface for engaging a side of a metallic cylindrical object. Each permanent magnet unit has a fixed magnet disposed within the unit which is relatively fixed to the forward-facing clamping surface. Each permanent magnet unit also has a rotatable magnet mounted on a shaft and configured such that each of the rotatable magnets is selectively rotatable from a first position, relative to an adjacent fixed magnet to a second position relative to the adjacent fixed magnet. In the first position, the magnetic flux from the rotatable magnets and the magnetic flux from the fixed magnets counteract one another, such that the magnetic force applied to the clamping surface is minimal, approaching zero. In the second position, the magnet flux from the rotatable magnet and the magnet flux from the fixed magnet are additive, such that the magnetic force applied to the clamping surface is at a maximum. As suggested from this configuration, the metallic cylindrical objects are not attached to the forward-facing clamping surface when the rotatable magnets are in the first position but are securely attached to the forward facing clamping surface when the rotatable magnets are in the second position.

The first permanent magnet units may have a positioning mechanism attached to the shaft of the first permanent magnet unit and configured such that the positioning mechanism may be actuated to selectively rotate the rotatable magnet of the first permanent magnet unit from the first position to the second position and from the second position to the first position. A linkage assembly may attach the shaft of the first permanent magnet unit to a comparable shaft of the second permanent magnet unit such that the rotation of the shaft of the first permanent magnet unit results in rotation of the shaft of the second permanent magnet unit. In this configuration, when the rotatable magnet of the first permanent magnet unit is rotated from the first position to the second position, the rotatable magnet of the second permanent magnet unit also rotates from the first position to the second position, such that the magnetic forces applied to the clamping surfaces of the first permanent magnet unit and the second permanent magnet unit are at a maximum in the second position and at a minimum in the first position.

A first metallic cylindrical object may be secured to the clamping surface of the first permanent magnet when the first rotatable magnet has been rotated from the first position to the second position and released when the first rotatable magnet has been rotated from the second position to the first position. Likewise, a second metallic cylindrical object may be secured to the clamping surface of the second permanent magnet when the second rotatable magnet has been rotated from the first position to the second position and released when the second rotatable magnet has been rotated from the second position to the first position.

The permanent magnet units are configured such that the maximum magnetic force is sufficient to retain the metallic cylindrical objects in engaging contact with the clamping surfaces of each of the permanent magnet units, thereby securing the metallic cylindrical objects to the hand truck for either maintaining the metal cylindrical objects in a secure standing position or for transporting the objects. When it is desired to release the metallic cylindrical objects from the hand truck, positioning mechanism may be actuated such that the rotatable magnets of the first permanent magnet unit and the second permanent magnet units are placed in the first position, which reduces the magnetic force applied to the clamping surfaces to a minimum magnetic force approaching zero, which releases the metallic cylindrical objects from each of the clamping surfaces and allowing the objects to be removed from the hand truck.

The positioning apparatus may have a locking mechanism which locks the first rotatable magnet and the second rotatable magnet in the first position and/or the second position.

Among other sources, acceptable permanent magnets are manufactured by ARMSTRONG MAGNETICS, INC. These permanent magnets are capable of securing loads ranging from 330 lbs to over 4000 lbs.

An embodiment of the hand truck may comprise one or more caster wheels attached at the rear of the hand truck. The caster wheels provide additional stability and facilitates steering of the hand truck. The caster wheels may be attached to the underside of a caster wheel attachment plate which may be pivotally attached to the left-side axle support member and to right-side axle support member. A support member may extend from a support bracket attached to the left-side rail member and the right-side rail member. The support member may either comprise a single piece, or the support member may comprise a first support segment pivotally attached to a second support segment, where the support member is configured to allow the caster wheel attachment plate to be pivoted from a first position where the caster wheel engages the ground or floor surface to a second position where the caster wheel is raised above the floor or ground surface. This configuration allows the caster wheel attachment plate to be folded upwardly to facilitate storage of the hand truck. A biasing mechanism, such as a spring, pneumatic cylinder, or hydraulic cylinder, may extend between the first support segment to other structure on the hand truck, such as the magnet support bracket.

In some embodiments of the hand truck, the left-side rail member and the right-side rail member may each have a ground engaging foot member. The foot members provide additional stability to the hand truck when it is in a vertical position, particularly when the caster wheel attachment plate has been folded upwardly.

Embodiments of the hand truck may also have cylinder safety mechanisms which prevent the metallic cylindrical objects from being released from the hand truck when the safety mechanisms are engaged. The cylinder safety mechanisms prevent the metallic cylindrical objects from falling when the magnetic force to the clamping surfaces has been reduced to the minimum magnetic force with the rotatable magnets of the first permanent magnet unit and the second permanent magnet units being placed in the first position A cylinder safety mechanism may be attached to the left-side rail member for a metallic cylindrical object set on the left side of the hand truck and a comparable cylinder safety mechanism may be attached to the right-side rail member for a metallic cylindrical object set on the right side of the hand truck. Each cylinder safety mechanism may comprise a safety plate attached to a distal end of a shaft, where the shaft rotatably attached to an adjacent rail member and/or cargo support brackets by means of bushings or the like. The shaft extends upwardly to proximate end adjacent to the handle member. The safety plate is configured to be rotated by the shaft into a locked position in which the safety plate is positioned beneath a bottom surface of the adjacent cylindrical metallic object. The safety plate is also configured to be rotated by the shaft into an unlocked position where the safety plate is not beneath the bottom surface of the adjacent metallic cylindrical object, thereby allowing each of the metallic cylindrical objects to be released from the hand truck.

Each shaft of the respective cylinder safety mechanisms may have a tab member attached to the shaft, where each tab member is configured to align with an engagement member attached to either the left-side rail member or the right-side rail member. The tab members and the engagement members are configured such that when the safety plates are in the locked position, each tab member and the engagement member are in engaging contact, but when a safety plate is in the unlocked position, the tab member and the engagement member are separated. A mechanism may be utilized to releasably attach the tab member to the engagement member to maintain the cylinder safety mechanism in the locked position. Such mechanism may include a biasing device, a retaining clip, a fastener which extends through aligned apertures in the tab member and the engagement member, or the like. The mechanism may also be configured from a first magnet affixed to the tab member and a second magnet affixed to engagement member, where the first magnet and the second magnet are configured to be magnetically attracted when the tab member and the engagement member are in engaging contact.

A gripping lever, knob, handle, or the like may be attached to the proximate end of each shaft to facilitate the operation of the cylinder safety mechanisms.

It should also be noted that embodiments of the present hand truck do not have a nose plate. The absence of a nose plate allows the hand truck to be rolled directly against a metallic cylindrical object so that the forward-facing clamping surface of the first permanent magnet unit may engage a side of a first metallic cylindrical object and, if desired, the forward-facing clamping surface of the second permanent magnet unit may engage a side of a second metallic cylindrical object. Once so engaged, the positioning mechanism may be actuated to provide maximum magnetic force to the forward-facing clamping surface of the first permanent magnet and to the second permanent magnet which will strongly secure the metallic cylindrical objects to the forward-facing clamping surfaces. Once so secured, a user may employ the leverage provided at the handle member of the hand truck to pivot the bottom of the metallic cylindrical objects off the floor or ground surface and engage the cylinder safety mechanisms. Upon being secured to the hand truck, the metallic cylindrical objects may be moved with the hand truck or otherwise positioned for vertical storage of the metallic cylindrical objects.

DETAILED DESCRIPTION OF THE EMBODIMENTS

Figure 1:
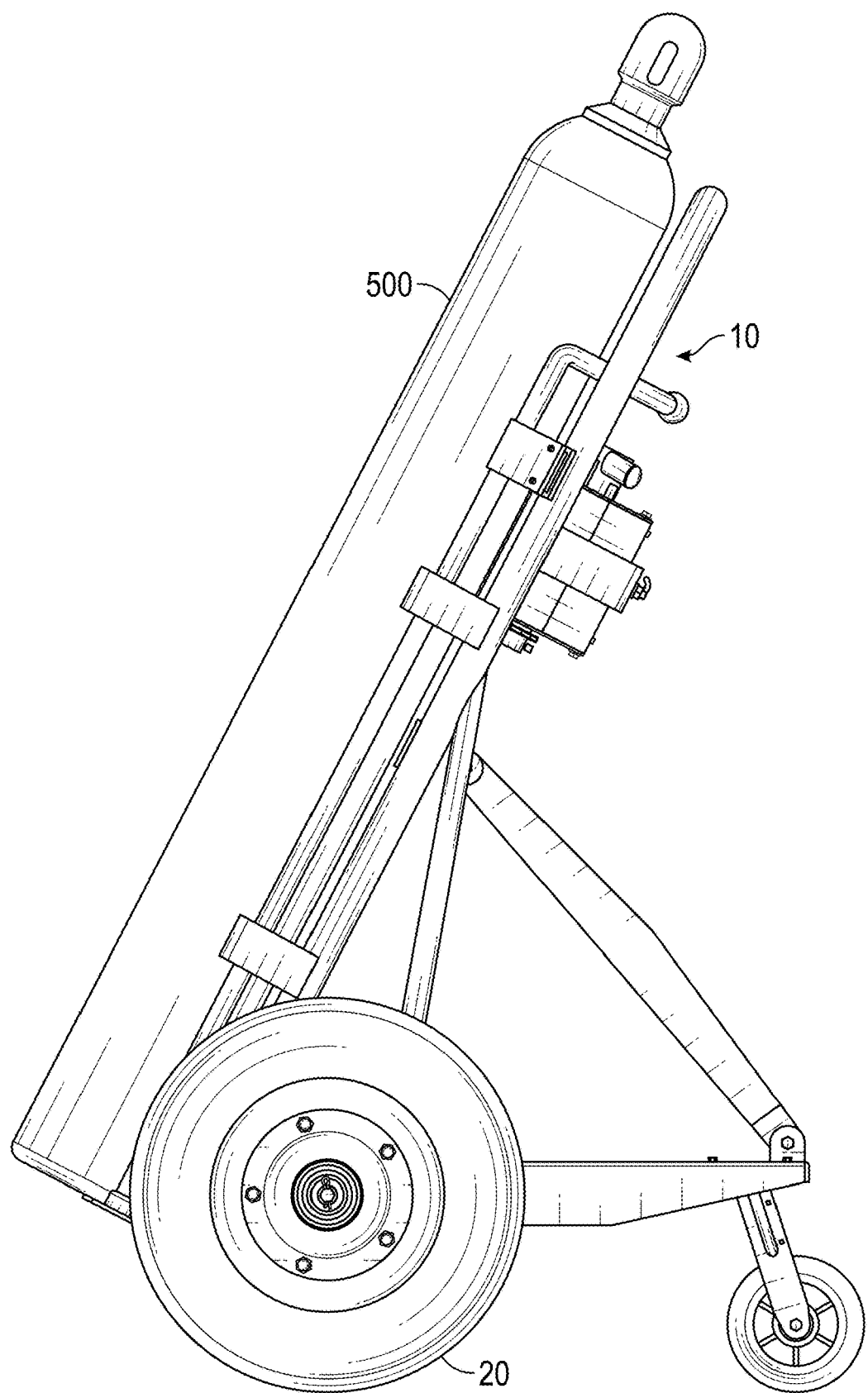
FIG. 1 depicts a side view of an embodiment of the disclosed apparatus with cylinders loaded on the apparatus.
Figure 2:
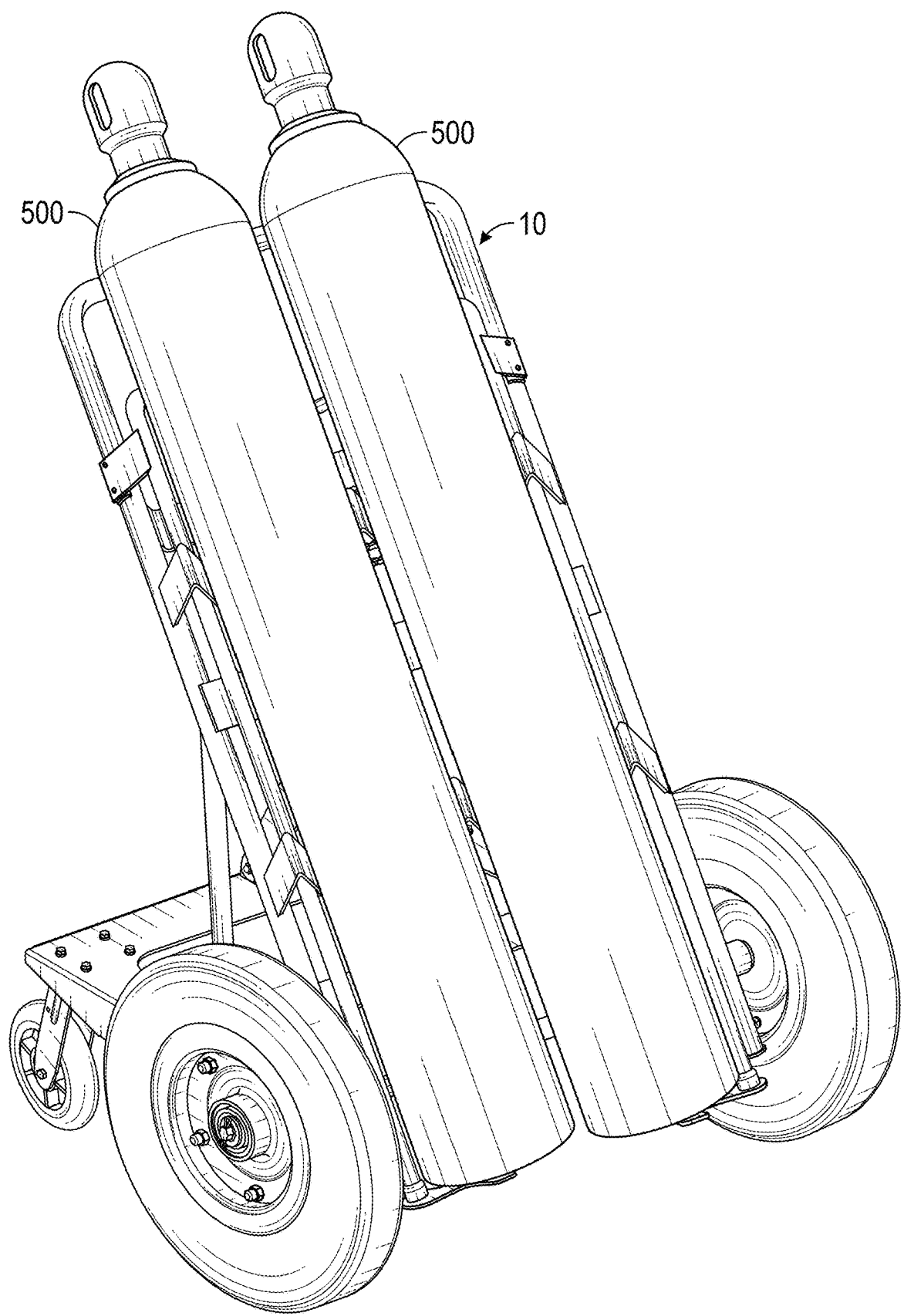
FIG. 2 depicts a front perspective view of an embodiment of the disclosed apparatus with cylinders loaded on the apparatus.
Figure 3:
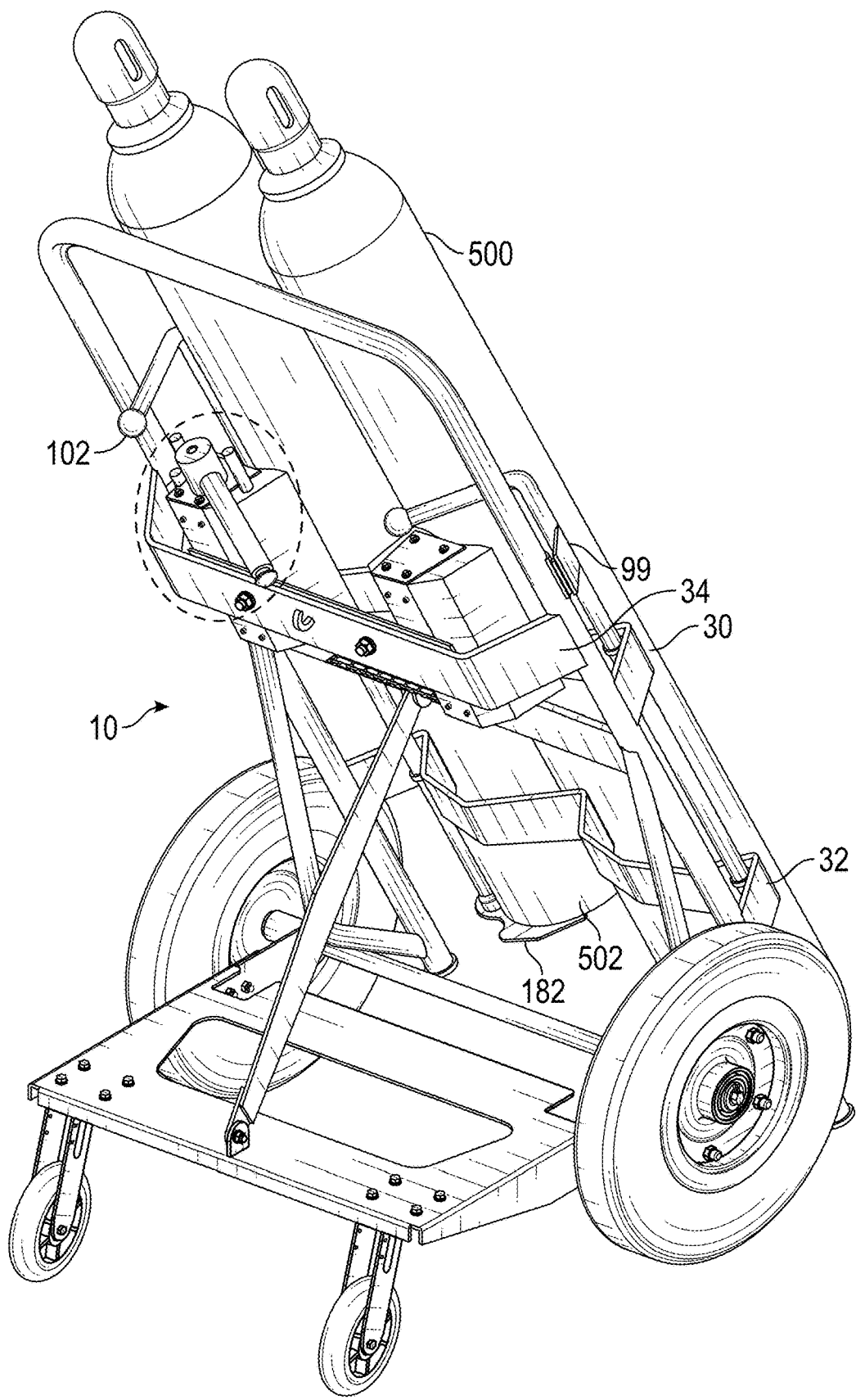
FIG. 3 depicts a rear perspective view of an embodiment of the disclosed apparatus with cylinders loaded on the apparatus.
Figure 4:
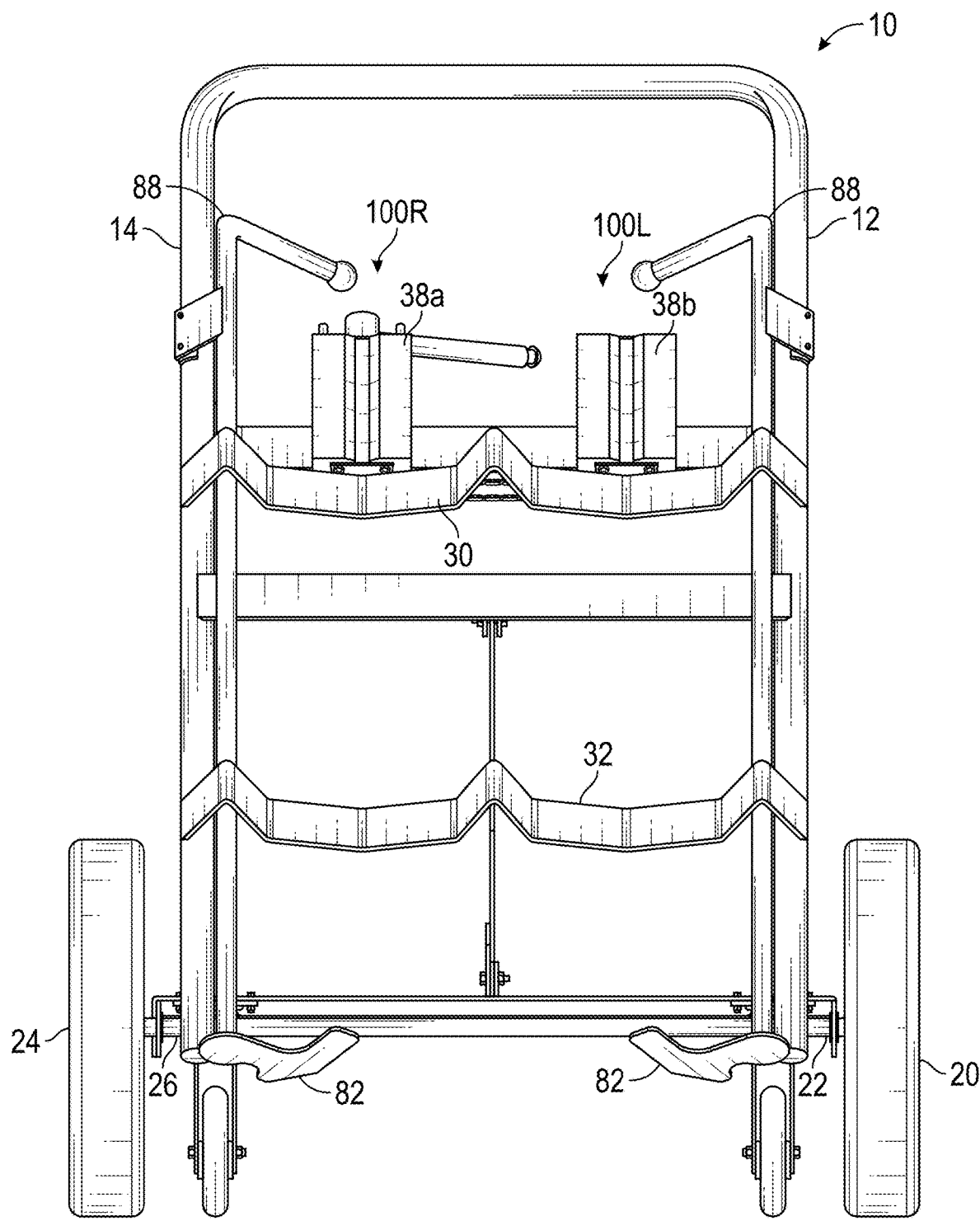
FIG. 4 depicts a front view of an embodiment of the disclosed apparatus.
Figure 5:
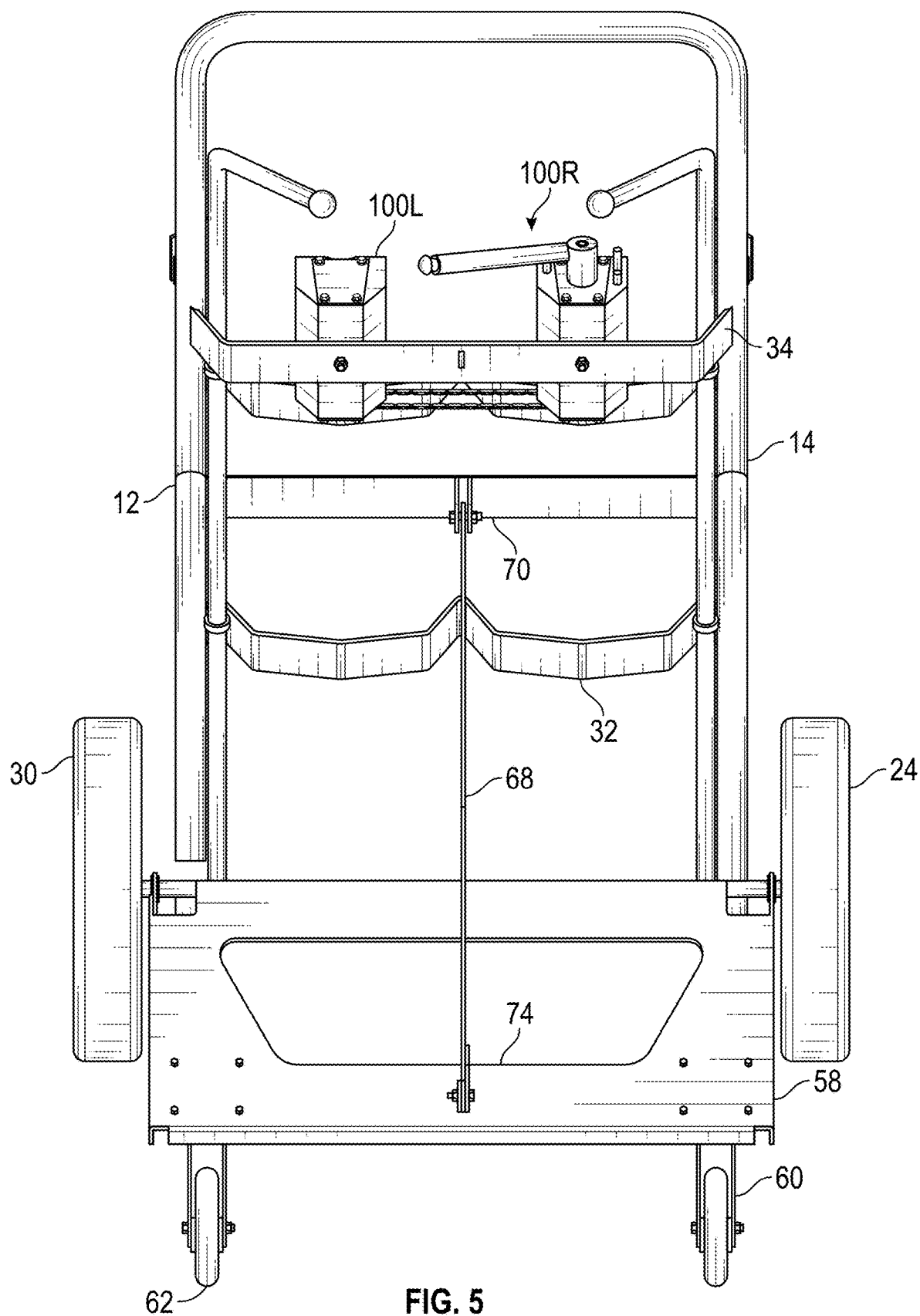
FIG. 5 depicts a rear view of an embodiment of the disclosed apparatus.
Figure 6:
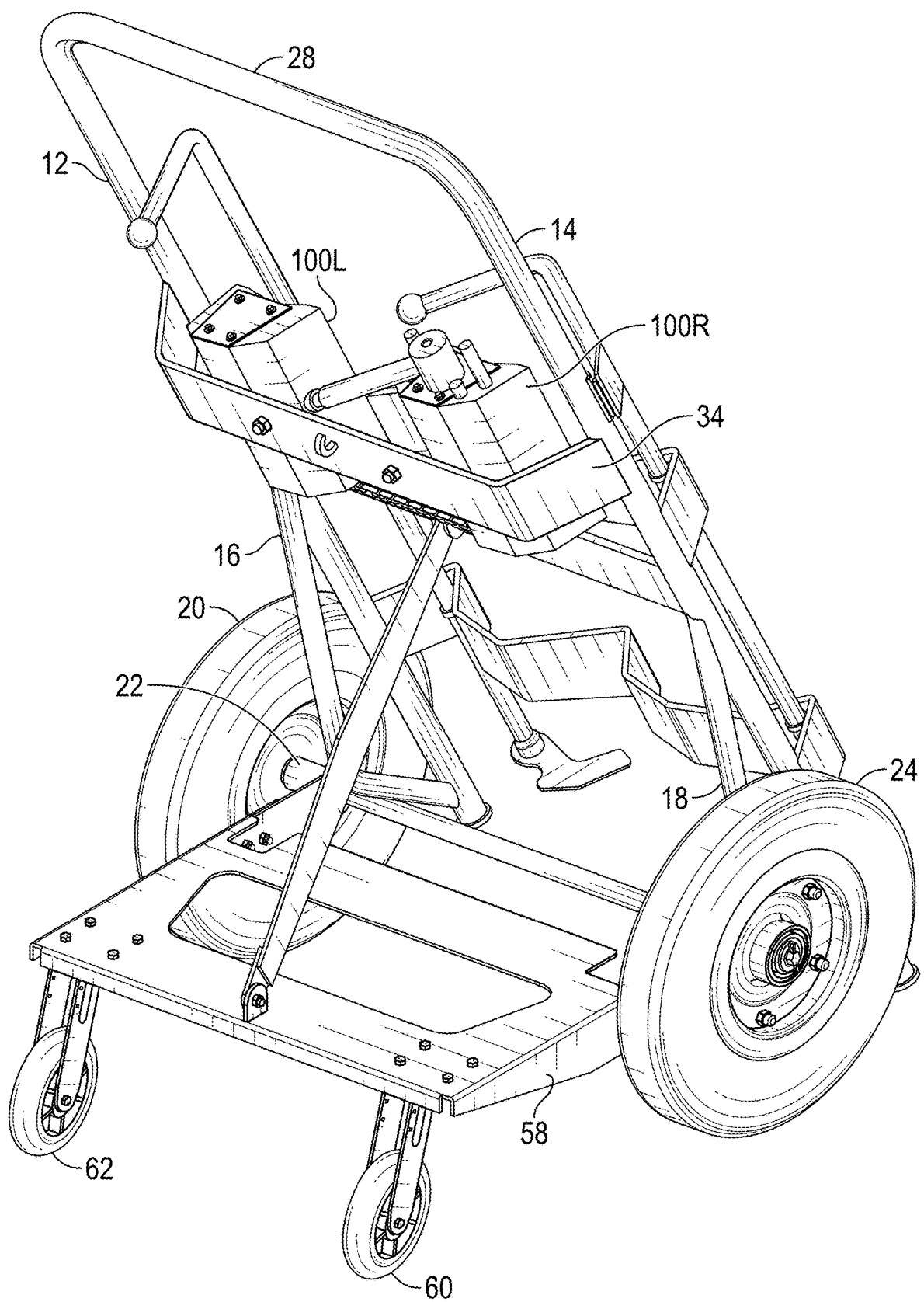
FIG. 6 depicts a right-side rear perspective view of an embodiment of the disclosed apparatus.
Figure 7:
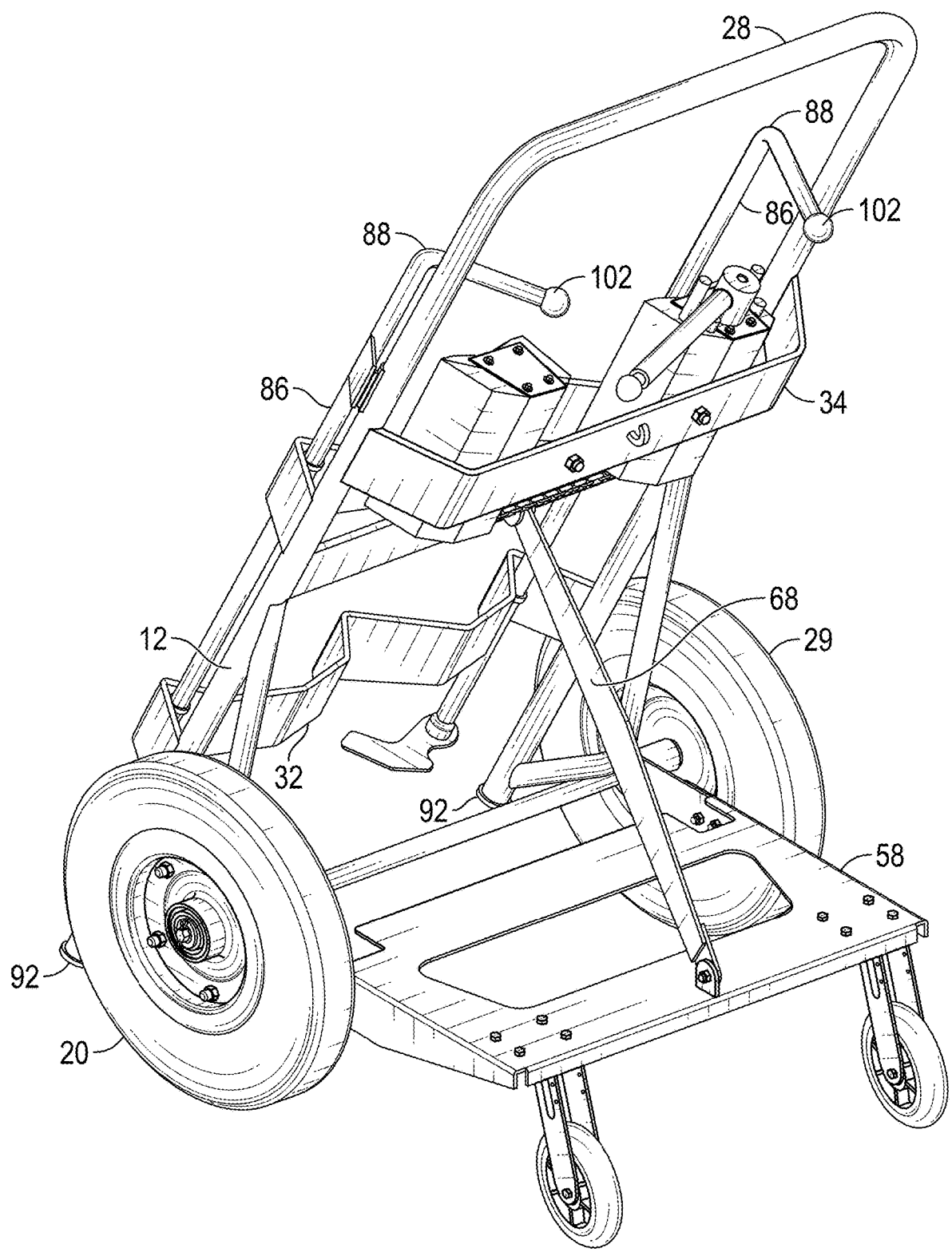
FIG. 7 depicts a left-side rear perspective view of an embodiment of the disclosed apparatus.
Figure 8:
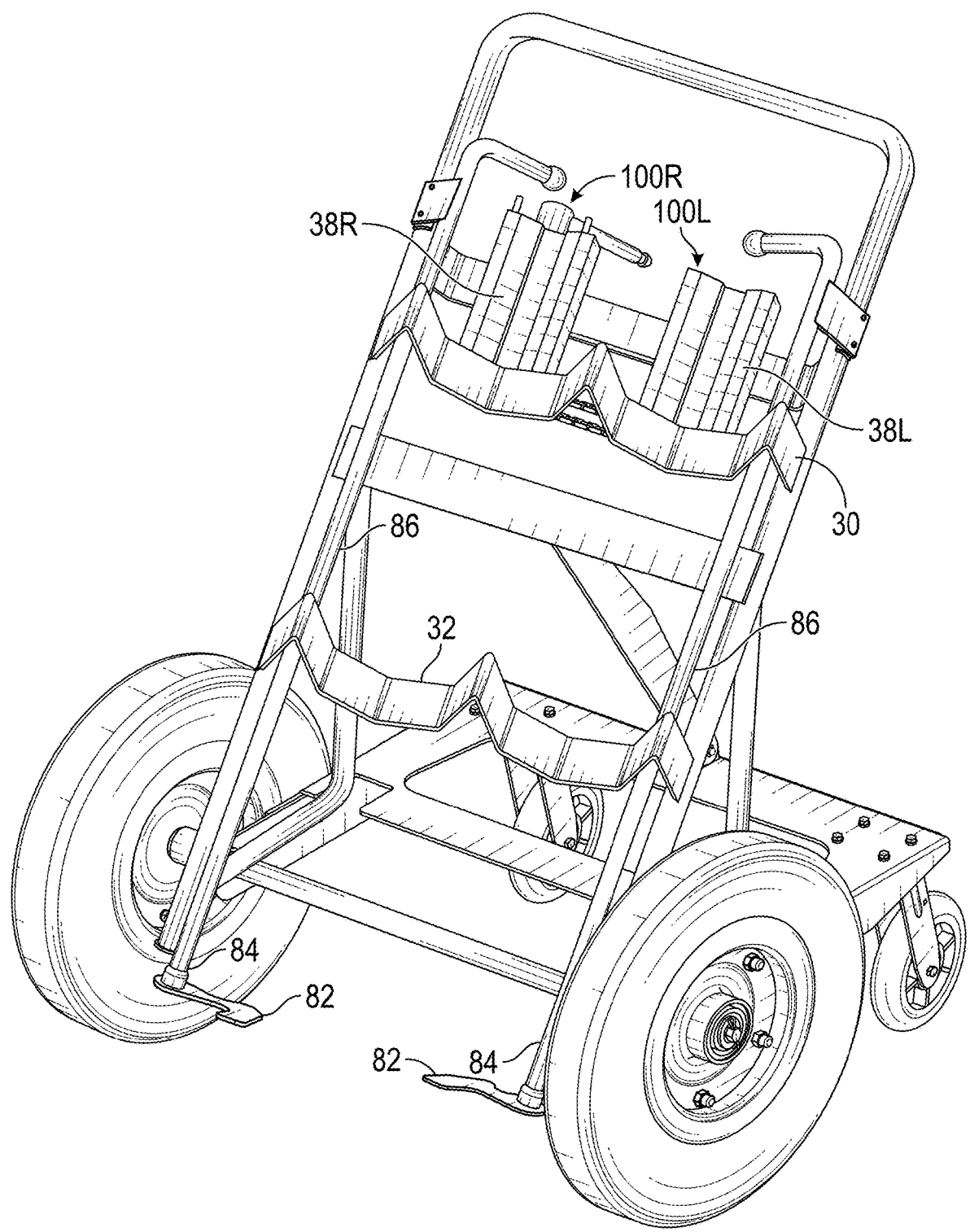
FIG. 8 depicts a left-side front perspective view of an embodiment of the disclosed apparatus.
Figure 9:
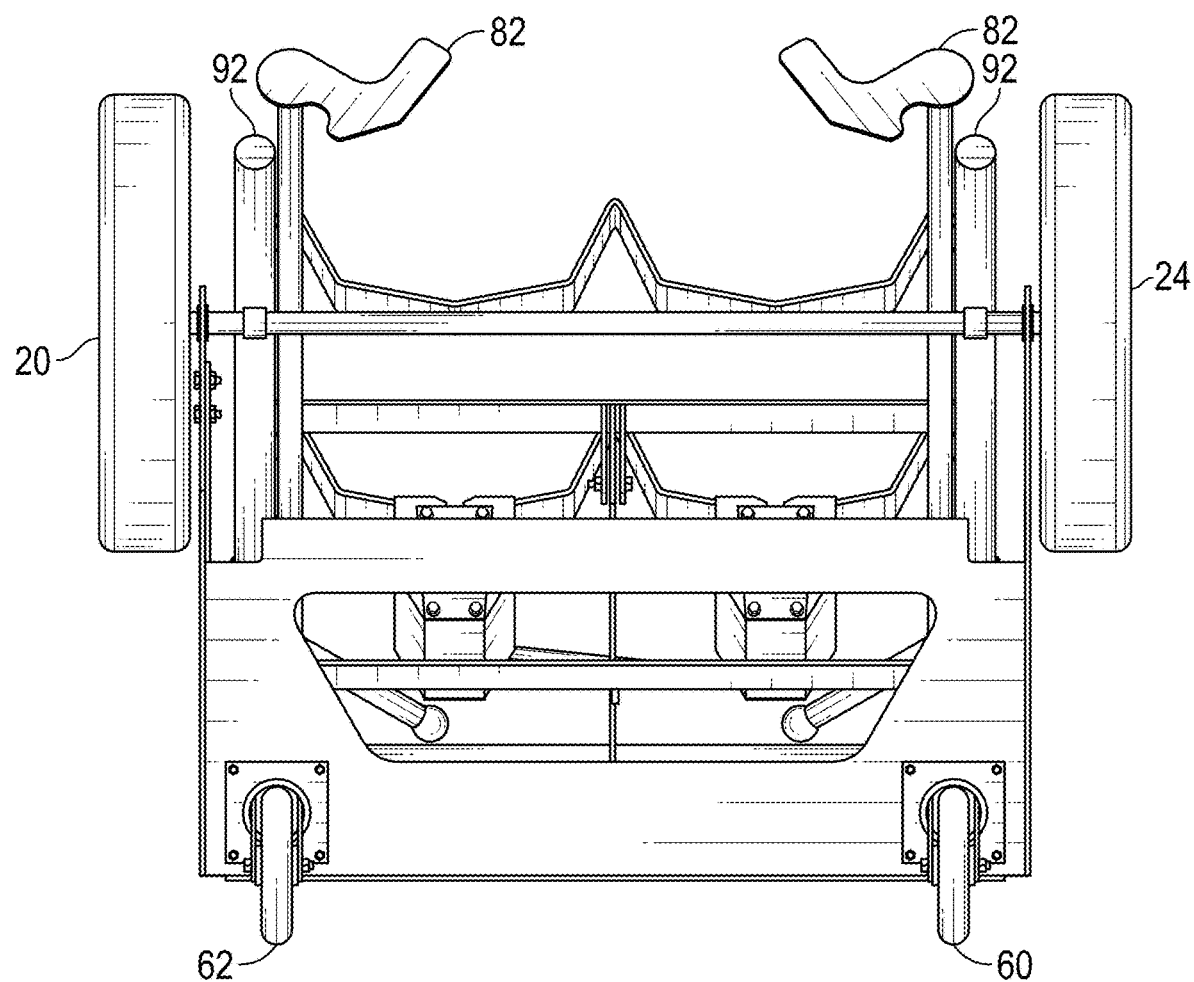
FIG. 9 depicts a bottom view of an embodiment of the apparatus.
Figure 10:
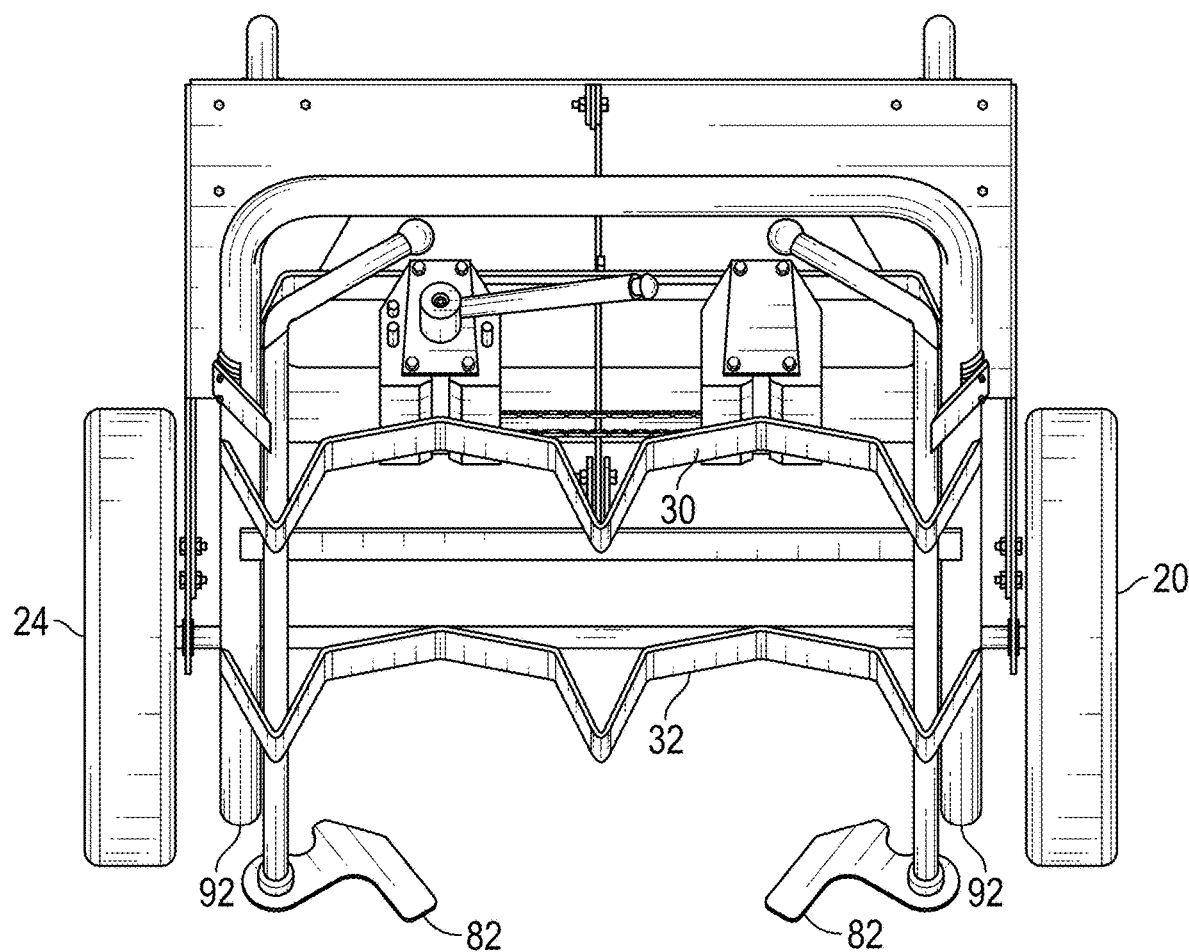
FIG. 10 depicts a top view of an embodiment of the apparatus.
Figure 11:
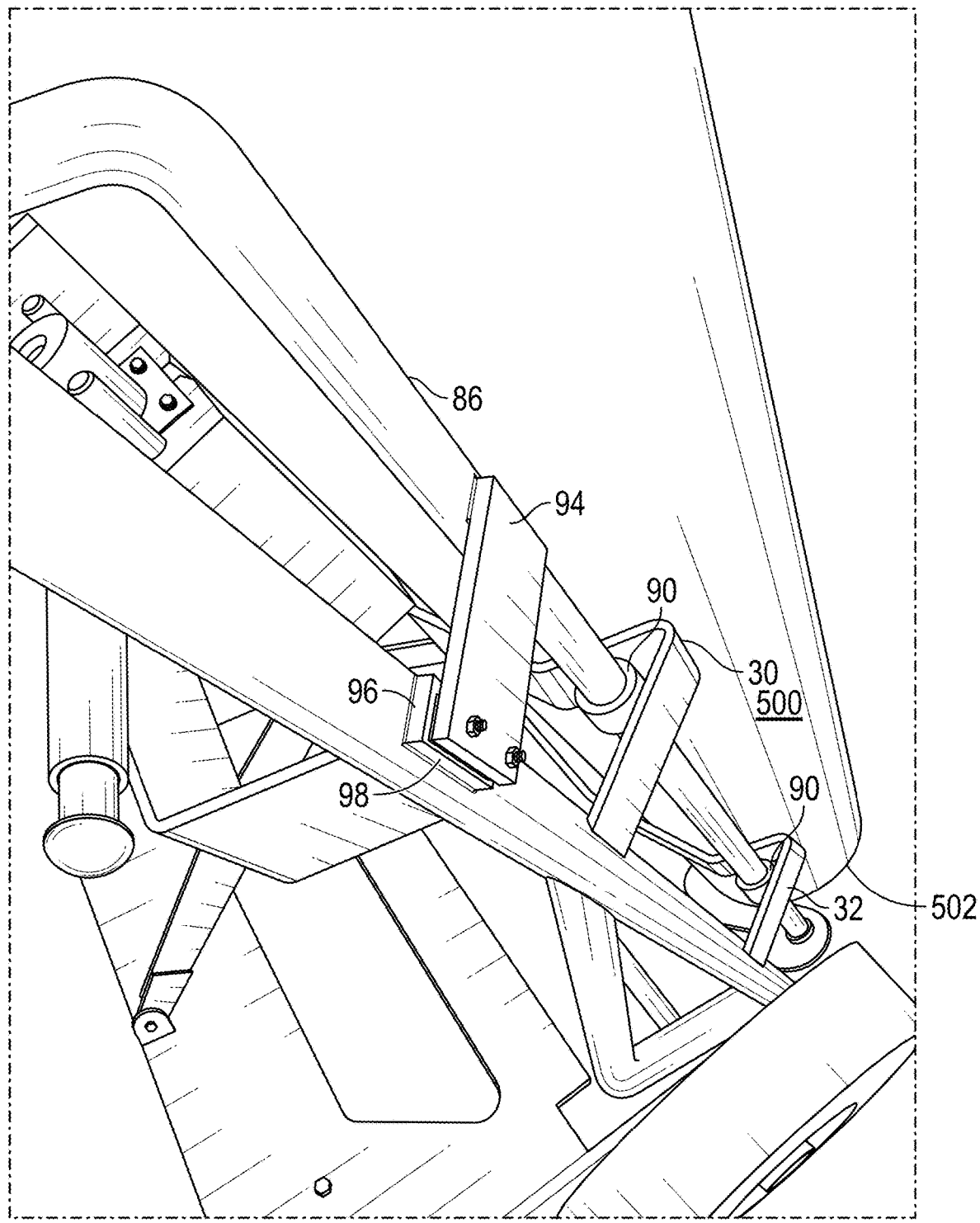
FIG. 11 shows a downward rear perspective view of the right side of an embodiment of the disclosed apparatus showing detail of the right-side safety assembly.
Figure 12:
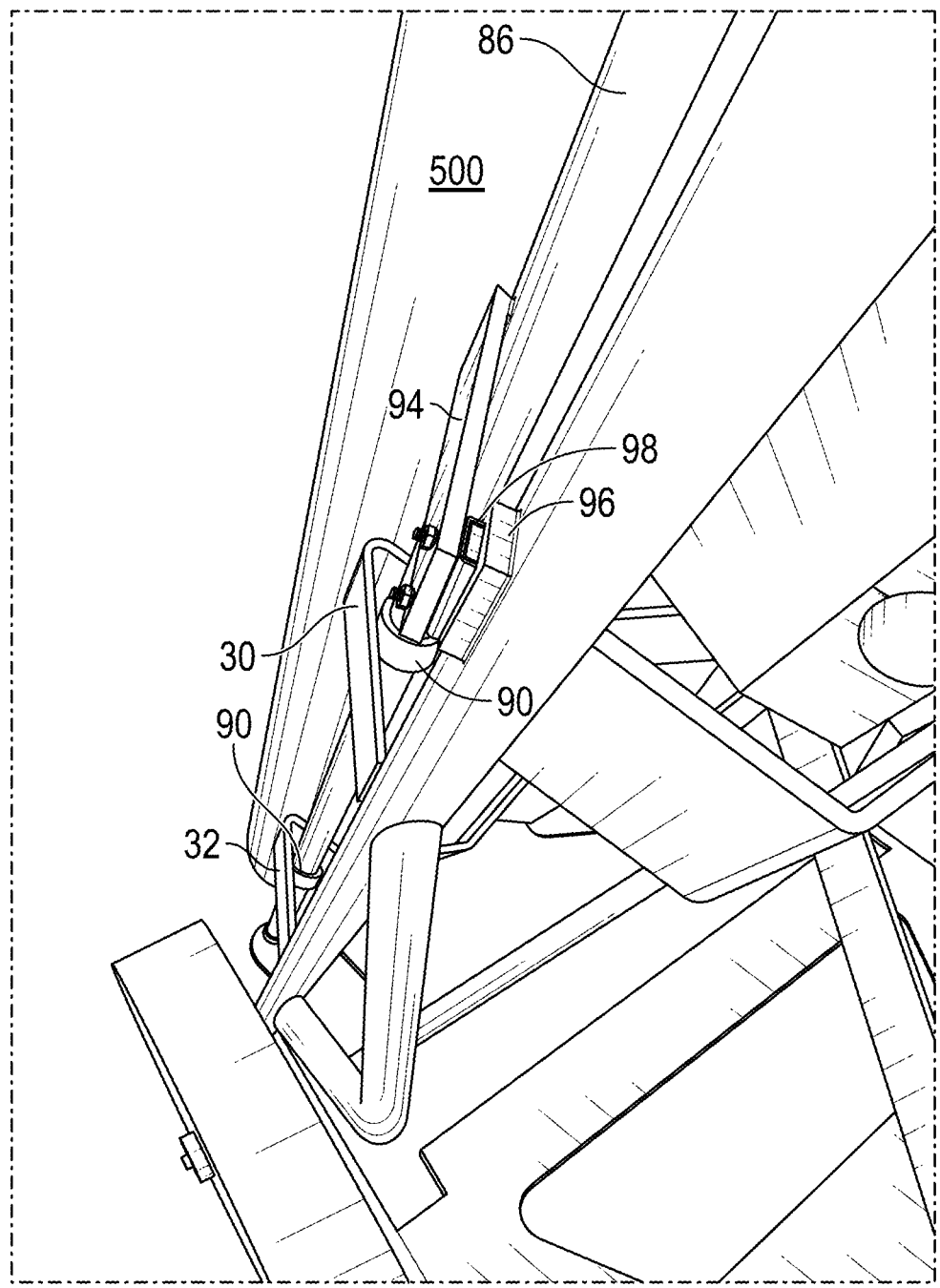
FIG. 12 shows a downward rear perspective view of the left side of an embodiment of the disclosed apparatus showing detail of the left-side safety assembly.
Figure 17:
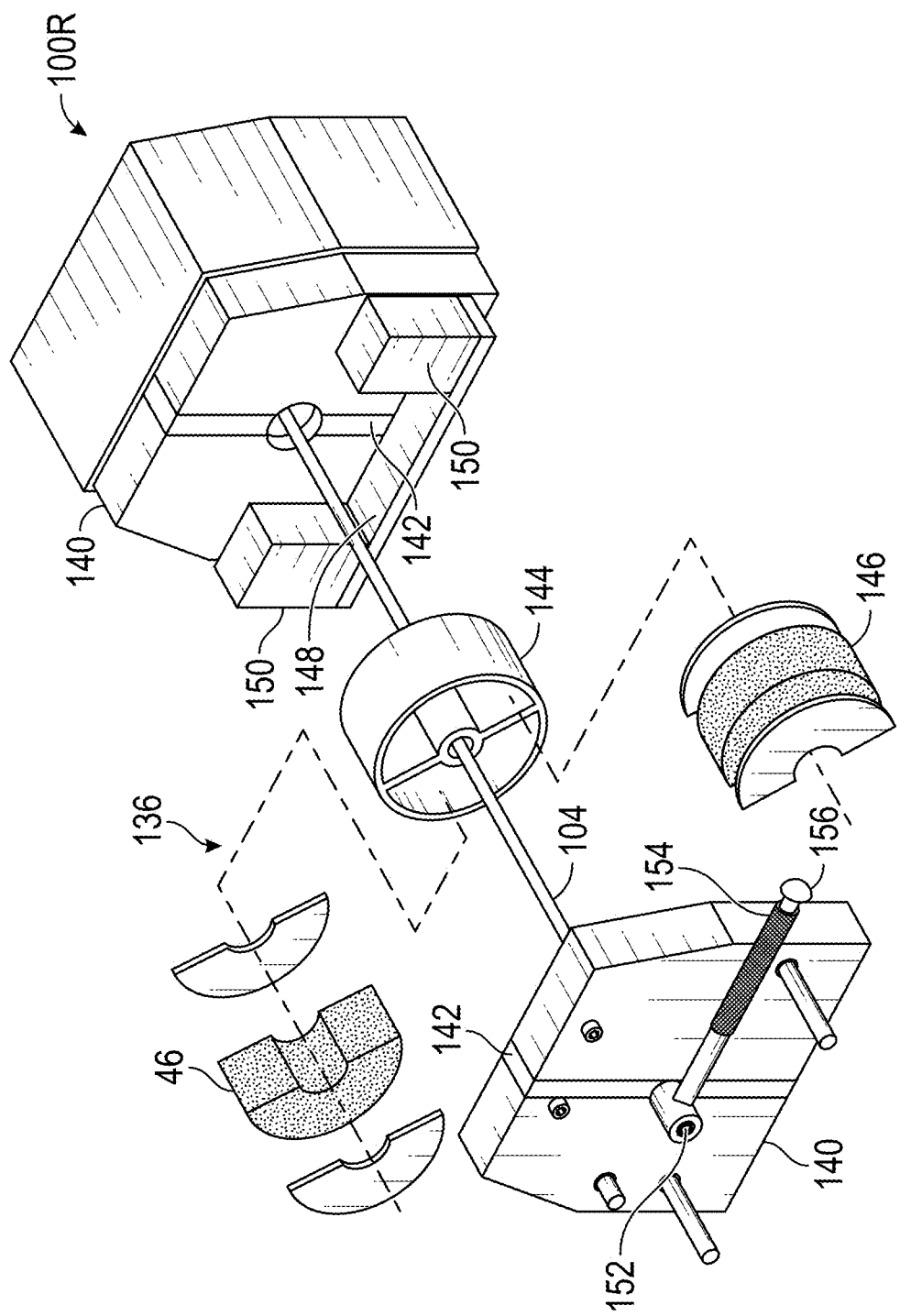
FIG. 17 shows an exploded view of an embodiment of permanent magnet which may be utilized with the disclosed hand truck.

Referring now to the figures, FIGS. 1-3 show various views of an embodiment of the disclosed hand truck 10 which may be utilized for securing and transporting a pair of metallic cylindrical objects, such as gas cylinders 500, in a side-by-side arrangement. FIGS. 4-10 depict various views of an embodiment of the hand truck without any objects loaded on the hand truck. FIGS. 11-12 provide detailed views of a how a shaft of the cylinder safety device may be configured. FIGS. 13-16 show detailed views of an embodiment of linking apparatus which may be utilized to connect a pair of permanent magnet units 100. FIG. 17 shows an exploded view of an embodiment of a permanent magnet which may be utilized with embodiments of the hand truck 10.

In describing the hand truck 10, terms like left-side, right-side, upward, downward, forward, rearward, etc. are made with respect to the orientation of the embodiments depicted in the figures to identify specific items appearing in the figures and are not intended limit in any way the scope of the claims set forth hereafter.

An embodiment of hand truck 10 has a left-side rail 12 and a right-side rail 14 which are assembled in a parallel configuration. Left-side rail 12 has a left-side axle support member 16 and right-side rail member 14 has a right-side axle support member 18. A left-side wheel 20 is attached to a left-side axle 22 which is supported by the left-side axle support member 16. A right-side wheel 24 is attached to a right-side axle 26 which is supported by the right-side axle support member 18.

Hand truck 10 has a handle member 28 which spans between an upper end of left-side rail member 12 and an upper end of right-side rail member 14. An upper cargo support bracket 30 spans between the left-side rail member 12 and the right-side rail member 14, with the upper cargo support bracket comprising a left support cradle for supporting an upper portion of a first gas cylinder 500 and a right support cradle for supporting an upper portion of a second gas cylinder. Similarly, a lower cargo support bracket 32 spans between the left-side rail member 12 and the right-side rail member 14, with the lower cargo support bracket comprising a right support cradle for supporting a lower portion of a first gas cylinder and a right support cradle for supporting a lower portion of a second gas cylinder.

A magnet support bracket 34 spans between the left-side rail member 12 and the right-side rail member 14, with magnet support bracket 34 extending backwardly in the center portion. Permanent magnet units $100_R$, $100_L$ are attached to the magnet support bracket 34. A right-side permanent magnet unit $100_R$ has a forward-facing clamping surface $38_R$ which is configured to engage a side of a first metallic cylindrical object such as the welding gas cylinders 500 depicted in FIGS. 1-3. Likewise, left-side permanent magnet unit 100L has a has a forward-facing clamping surface $38_L$ which is configured to engage a side of a second metallic cylindrical object. Specific details of the permanent magnet units $100_R$, $100_L$ are provided below.

An embodiment of hand truck 10 may have a caster wheel attachment plate 58 having right-side caster wheel 60 attached to an underside of the attachment plate 58. Likewise, a left-side caster wheel 62 may be attached to the underside of the attachment plate 58. The caster wheel attachment plate 58 may be pivotably attached to the left-side axle support member 16 and the right-side axle support member 18. A support member 68 may have a first end 70 attached to a support bracket 72 spanning between the left-side rail 12 and the right-side rail 14. The second end 74 of support member 68 is attached to the upper side 74 of caster wheel attachment plate 58. Support member 68 may be configured into a first segment which is pivotally attached to a second segment thereby allowing caster wheel attachment plate 58 to pivot back and forth from a first position where caster wheels 60, 62 engage the floor or ground to a second position where the caster wheels 60, 62 are raised above the ground surface. A biasing mechanism, such as a spring, may extend between the first support segment to the magnet support bracket 34 or to other structure spanning the left-side rail 12 and the right-side rail 14. This configuration allows the caster wheel attachment plate 58 to be pivoted upwards toward the left-side rail 12 and the right-side rail 14 resulting in a more compact device.

The caster wheels 60, 62 provide additional support to the hand truck 10 when one or more metallic cylindrical objects have been loaded on to the hand truck 10, and it facilitates the steering of the hand truck.

Embodiments of the hand truck 10 may further utilize a safety mechanism which prevent the metallic cylindrical objects from being inadvertently released from the hand truck. A separate safety mechanism may be utilized on each side of the hand truck thereby securing a cylindrical object loaded on either side of the hand truck. Each safety mechanism utilizes a safety plate 82 which is attached to an end 84 of a shaft 86. Each shaft 86 has an opposite end 88 which are adjacent to handle member 28. As depicted in FIGS. 11-12, each shaft 86 may extend through bushings 90 attached to structural members of the hand truck 10, such as to upper cargo support bracket 30 and to lower cargo support bracket 32. As depicted in FIGS. 1-3, each safety plate 82 is rotated until it rests beneath a bottom surface 502 of the cylindrical object 500 which is referred to as a "locked position." When each safety plate 82 has been rotated so that it is no longer beneath the bottom surface 502, the safety mechanisms are considered to be in an "unlocked position."

Each of the safety mechanisms may further include a tab member 94 which is attached to shaft 86. Tab members 94 are free to rotate until coming into engaging contact with engagement members 96 attached to left-side rail member 12 and the right-side rail member 14. When the tab members 94 and engagement members 96 are in engaging contact, the safety mechanism is in a locked position. When tab members 94 are rotated so that each is no longer in engaging contact with the corresponding engagement member 96, that safety mechanism is in an unlocked position. A mechanism may be utilized which releasably attaches tab members 94 to engagement members 96. For example, a biasing mechanism, such as a spring, may be utilized which maintains the engaging contact between each tab member 94 and corresponding engagement member 96. Alternatively, the mechanism may include a retaining clip which releasably secures each tab member 94 to its corresponding engagement member 96. Alternatively, a fastener may extend through aligned apertures in the tab member and the engagement member, or the like. Alternatively, and as shown in the figures, the mechanism may be configured from a first magnet 98 affixed to the tab member 94.

Each of the safety mechanisms may also include grip levers 102 which are attached to ends 88 of shafts 86.

The left-side rail member 12 and the right-side rail member 14 may each have ground engaging foot members 92. The foot members 92 provide additional stability to the hand truck 10 when it is in a vertical position, particularly if the caster wheel attachment plate 58 has been folded upwardly.

Figure 13:
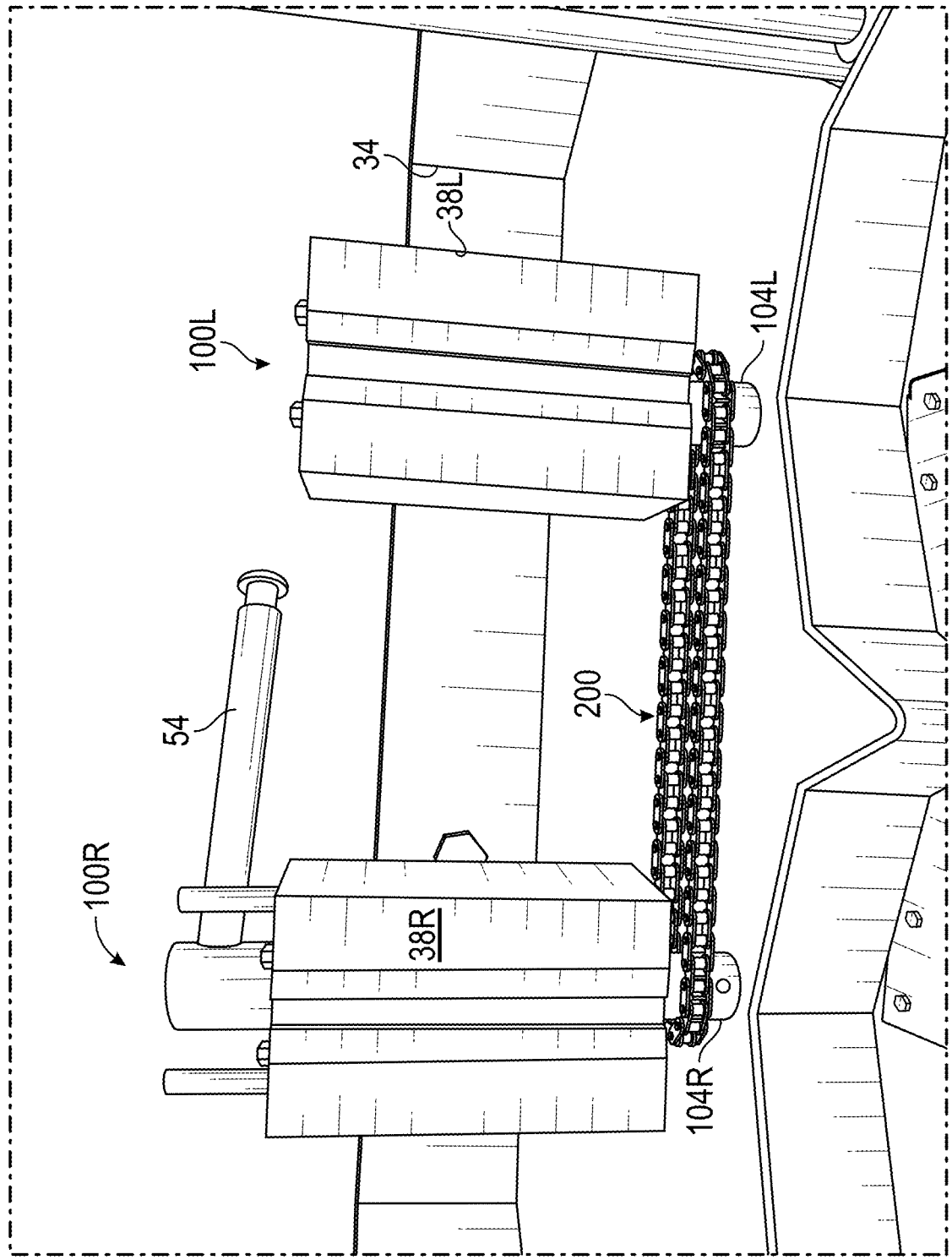
FIG. 13 depicts a front view of an embodiment of a linking mechanism which allows actuation of both magnets at the same time.
Figure 14:
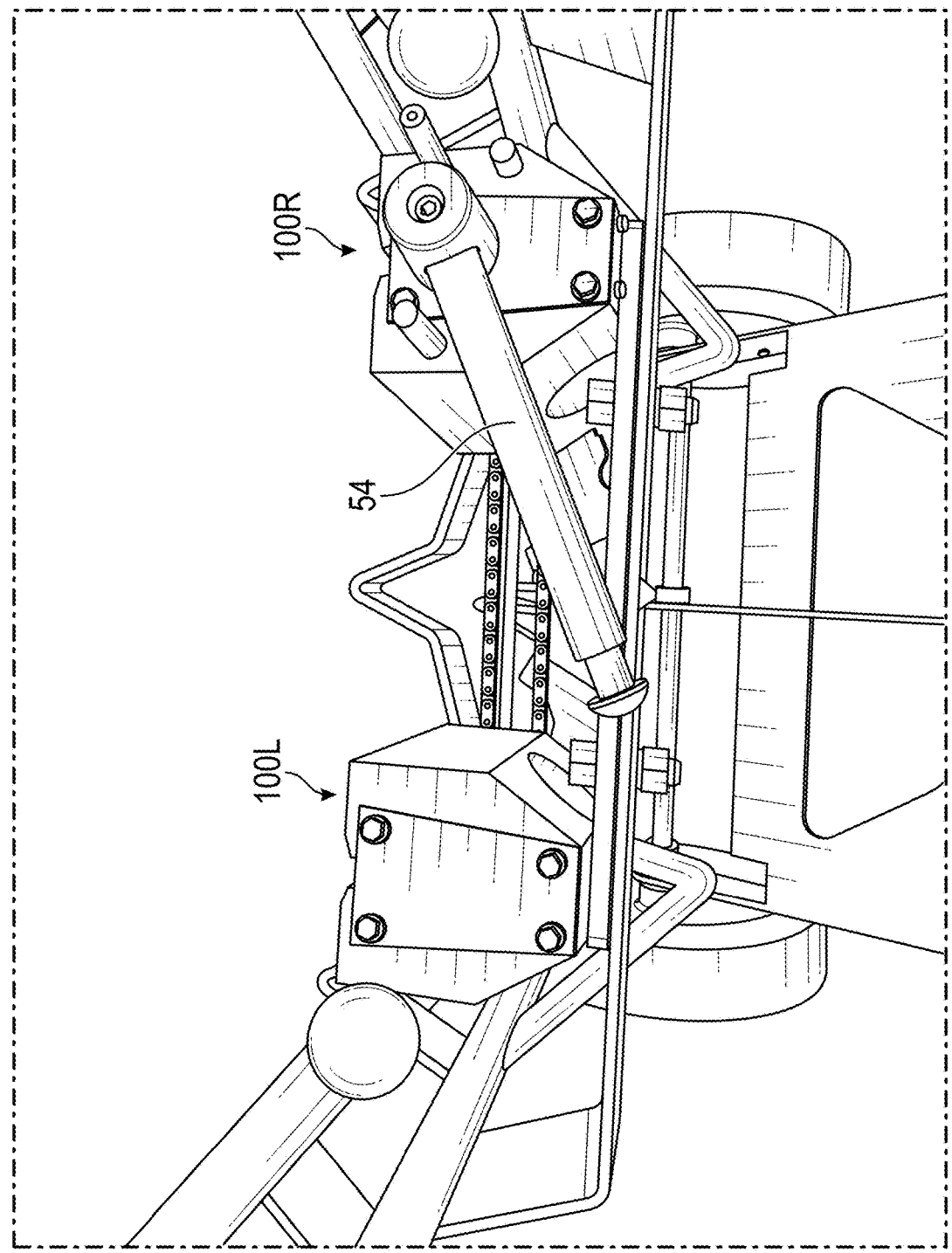
FIG. 14 depicts a top view of the linked pair of magnets.
Figure 15:
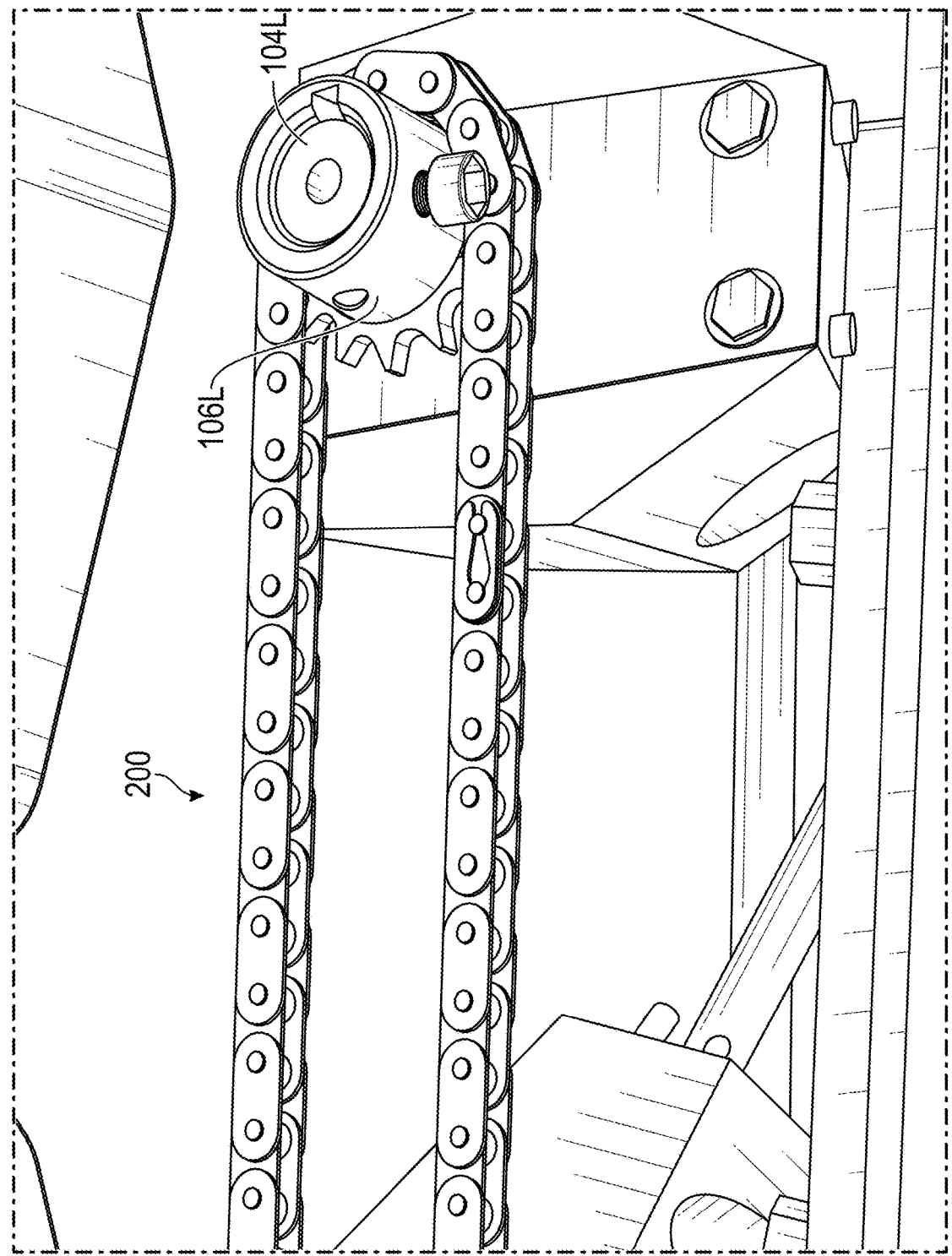
FIG. 15 shows a detailed view of the linking mechanism attached to the left-side magnet viewed from the underside.
Figure 16:
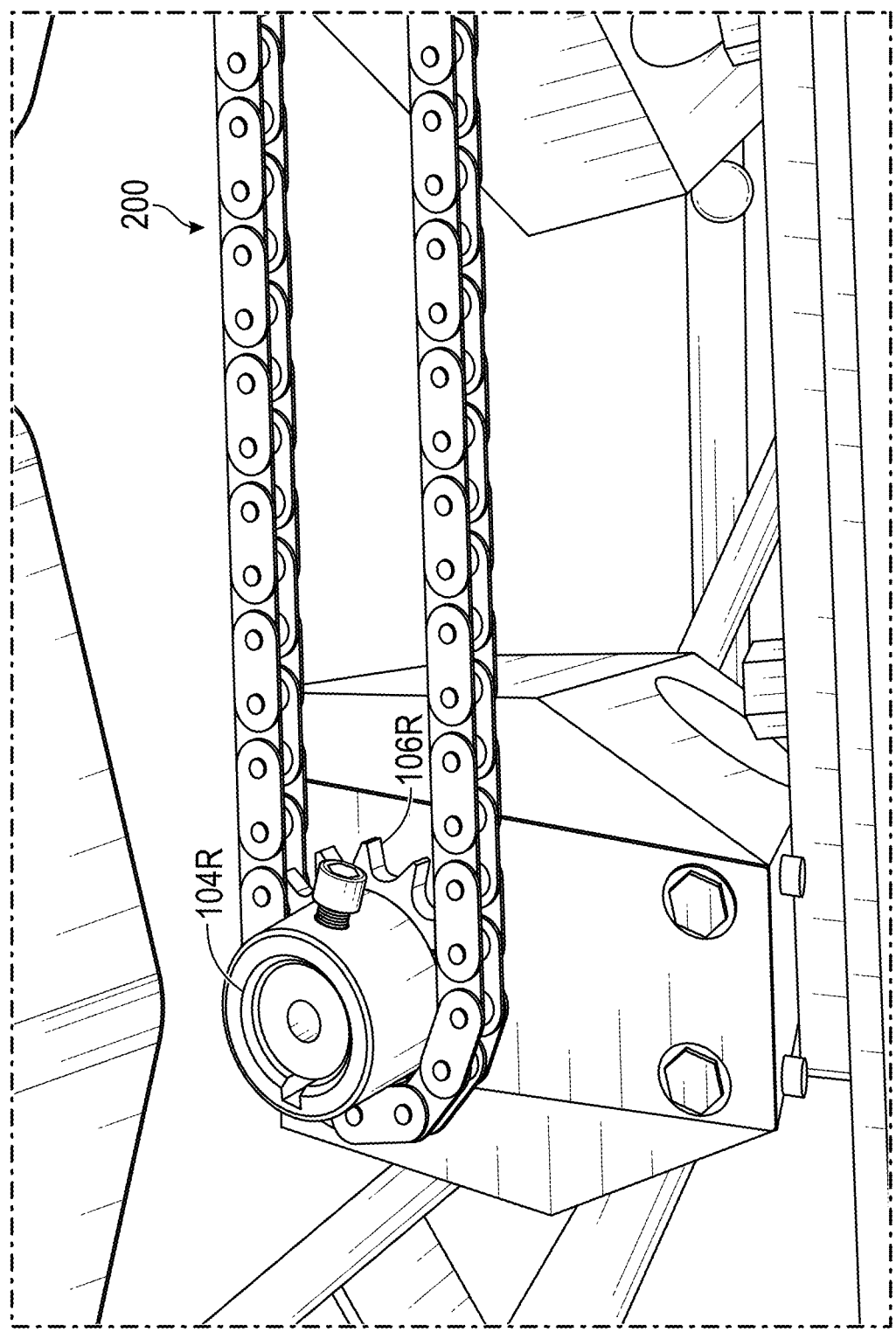
FIG. 16 shows a detailed view of the linking mechanism attached to the right-side magnet viewed from the underside.

FIGS. 13-16 depict how a linkage structure, such as chain 200, may be used to connect permanent magnet units $100_R$ and $100_L$ and thereby allow the two permanent magnet units to be simultaneously actuated by operation of a single actuation lever 54, which may be attached to the proximal end of shaft 104 of either permanent magnet units $100_R$ or $100_L$. The linkage structure connects a distal end of shaft $104_R$ of permanent magnet unit $100_R$ to the distal end of shaft $104_L$ of permanent magnet unit $100_L$ as shown in FIG. 13, in an end-less loop configuration. If a chain 200 is utilized as the linkage structure, shaft $104_R$ may be equipped with a geared sprocket $106_R$ and shaft $104_L$ is likewise equipped with a geared sprocket $106_L$. While the figures depict permanent magnet unit $100_L$ being actuated by a lever 54 attached to permanent magnet unit $100_R$, it is to be appreciated that either permanent magnet unit may be equipped with the actuation lever and thus actuate both devices. It is further to be appreciated that other linkage structures may be utilized such as a belt connected to pulleys on each of the shafts.

While different embodiments of magnets might be utilized in embodiments of the present invention, an embodiment of a permanent magnet unit 100 which may be utilized for permanent magnet unit $100_R$ is shown in greater detail in 17, which depicts a general configuration of such device. It is to be appreciated that permanent magnet unit $100_L$ will have the same general configuration, except for lever 54. Of course, it does not matter whether lever 54 is on permanent magnet units $100_R$ and $100_L$.

Permanent magnet unit 100 has a pair of polarity plates 140 disposed to be opposite each other to form the side walls of the unit, with the polarity plates having a non-magnetic medium 142 disposed between the plates. A rotor member 144 is axially supported by shaft 104 to be rotatable between the polarity plates 140. A pair of neodymium magnets 146 (the "rotatable magnet") are inserted in cavities set forth within rotor member 144, with the magnets 146 having their North/South magnetic poles opposite to each other. A spacer plate 148 is disposed below rotor member 144 between the polarity plates 140. A pair of fixed magnets 150 are placed on both ends of the spacer plate 148 to be adjacent to the rotor member 144. Rotor member 144 is mounted on shaft 104, which is secured to lever 54 by collar 152 or the like. Shaft 104 and rotor member 144 may be manually rotated back and forth between a first position and a second position with a positioning mechanism, such as lever 54. Lever 54 may be locked into either the first position or the second position with locking mechanism 156.

When lever 54 is rotated, the rotable magnets 146 in both permanent magnet units $100_R$ and $100_L$ are moved such that the directions of the magnetic forces of the rotatable magnets 146 and the polarity of the line of magnetic force is changed in both permanent magnet units. In this configuration, the rotatable magnets 146 are selectively rotatable to a first position relative to fixed magnets 150 where the magnetic forces applied by the fixed magnets 150 and the rotatable magnets 146 to the clamping surfaces $38_R$, 38L are at minimum magnetic force. In the first position, the metallic cylindrical objects are released. When the rotable magnets 146 of permanent magnet units $100_R$ and $100_L$ are rotated to a second position relative to fixed magnet 150, the magnetic forces applied by the rotatable magnets and the fixed magnet to clamping surfaces $38_R$, 38L are at a maximum. Thus, when it is desired to secure metallic cylindrical objects, such as gas cylinders 500, to the hand truck 10, a user simply pushes the hand truck against each gas cylinder such that the forward-facing clamping surfaces clamping surfaces $38_R$, 38L each engage a side of a cylinder 500. Once the forward-facing clamping surfaces $38_R$, 38L each engage a side of cylinder 500, the user releases locking mechanism 156 and rotates lever 154 to the second position. Once the lever has been so rotated, the magnetic forces directed through clamping surfaces $38_R$, 38L to cylinders 500 will secure the cylinders completely to the hand truck and the user can manipulate the cylinder as desired.

Having thus described the preferred embodiment of the invention, what is claimed as new and desired to be protected by Letters Patent includes the following:

1. A hand truck for securing and transporting a first metallic cylindrical object and a second metallic cylindrical object in a side-by-side arrangement, the hand truck comprising:
   a right-side rail member and a left-side rail member disposed in a parallel configuration;
   a right-side axle support member attached to the right-side rail member and a left side axle support member attached to the left-side rail member;
   a right-side wheel attached to a right-side portion of an axle extending from the right-side axle support member and a left-side wheel attached to a left-side portion of the axle extending from the left-side axle support member;
   a handle member which spans between an upper end of the right-side rail member and an upper end of the left-side rail member;
   a cargo support bracket which spans between the right-side rail member and the left-side rail member, the cargo support bracket comprising a right support cradle and an left support cradle, wherein the right support cradle is configured to engage a surface of the first cylindrical object and the left support cradle is configured to engage a surface of the second cylindrical object;

a magnet support bracket which spans from the right-side rail member and the left-side rail member;

a right-side magnet unit attached to a right-side of the magnet support bracket, the right-side magnet unit comprising a right-side forward-facing clamping surface for engaging a side of the first metallic cylindrical object, said right-side magnet unit further comprising a right-side fixed magnet relatively fixed to the right-side forward-facing clamping surface, the right-side magnet unit further comprising a right-side rotatable magnet disposed upon a right-side shaft, the right-side shaft comprising a proximal end and a distal end; wherein the right-side rotatable magnet is selectively rotatable on the right-side shaft from: (1) a first position relative to said right-side fixed magnet in which a magnetic force applied by said right-side fixed magnet and said right-side rotatable magnet to said right-side forward-facing clamping surface is a minimum magnetic force, to (2) a second position relative to said right-side fixed magnet wherein the magnetic force applied by said right-side fixed magnet and said right-side rotatable magnet to said right-side clamping surface is a maximum magnetic force;

a left-side magnet unit attached to a left-side of the magnet support bracket, the left-side magnet unit comprising a left-side forward-facing clamping surface for engaging a side of the second metallic cylindrical object, said left-side magnet unit further comprising a left-side fixed magnet relatively fixed to the left-side forward-facing clamping surface, the magnet unit further comprising a left-side rotatable magnet disposed upon a left-side shaft, the left-side shaft comprising a distal end, wherein the left-side rotatable magnet is rotatable from: (1) a first position relative to said left-side fixed magnet in which a magnetic force applied by said left-side fixed magnet and said left-side rotatable magnet to said left-side forward-facing clamping surface is a minimum magnetic force, to (2) a second position relative to said left-side fixed magnet wherein the magnetic force applied by said left-side fixed magnet and said left-side rotatable magnet to said left-side clamping surface is a maximum magnetic force;

an actuation lever attached to the proximal end of the right-side shaft and a first linkage attachment member attached to the distal end of the right-side shaft;

a second linkage attachment member attached to the distal end of the left-side shaft;

a linkage assembly attached in an end-less loop configuration around the first linkage attachment member and the second linkage attachment member; and a safety mechanism comprising a safety plate attached to a distal end of a shaft, the shaft comprising a proximate end adjacent to the handle member, wherein the shaft extends through a bushing attached to the cargo support bracket, the shaft rotatable within the bushing, wherein the safety plate is configured to rotate into a locked position wherein the safety plate is positioned beneath a bottom surface of the first cylindrical metallic object and the safety plate is configured to rotate into an unlocked position where the safety plate is not beneath the bottom surface of the first metallic cylindrical object.

2. The hand truck of claim 1 wherein the first linkage attachment member comprises a first sprocket, the second linkage attachment member comprises a second sprocket, and the linkage assembly comprises a chain.

3. The hand truck of claim 1 further comprising a caster wheel attachment plate comprising extending backwardly from the hand truck.

4. The hand truck of claim 3 further comprising a left-side caster wheel attached to a left side of the caster wheel attachment plate and a right-side caster wheel attached to a right side of the caster wheel attachment plate.

5. The hand truck of claim 1 wherein the left-side rail member and the right-side rail member each comprise a ground engaging foot member.

6. A hand truck for securing and transporting a first metallic cylindrical object and a second metallic cylindrical object, the hand truck comprising:

a left-side rail member comprising a left-side axle support member and right-side rail member comprising a right-side axle support member, the left-side rail member and the right-side rail member disposed in a parallel configuration;

a left-side wheel attached to a left-side axle extending from the left-side axle support member and a right-side wheel attached to a right-side axle extending from the right-side axle support member;

a handle member which spans between an upper end of the left-side rail member and an upper end of the right-side rail member;

a cargo support bracket spanning between the left-side rail member and the right-side rail member;

a magnet support bracket extending from the left-side rail member and the right-side rail member;

a first permanent magnet unit, the first permanent magnet unit comprising a first clamping surface for engaging the first metallic cylindrical object, the first permanent magnet unit comprising an actuation lever;

a second permanent magnet unit, the second permanent magnet comprising a second clamping surface for engaging the second metallic cylindrical object;

a linkage assembly connecting the first permanent magnet unit to the second permanent magnet unit, wherein the linkage assembly is configured such that a rotation of the actuation lever results in a simultaneous application of a magnetic force to the first clamping surface and to the second clamping surface; and a safety mechanism comprising a safety plate attached to a distal end of a shaft, the shaft comprising a proximate end adjacent to the handle member, wherein the shaft extends through a bushing attached to the cargo support bracket, the shaft rotatable within the bushing, wherein the safety plate is configured to rotate into a locked position wherein the safety plate is positioned beneath a bottom surface of the first cylindrical metallic object and the safety plate is configured to rotate into an unlocked position where the safety plate is not beneath the bottom surface of the first metallic cylindrical object.

7. The hand truck of claim 6 wherein the actuation lever is attached to a proximal end of a first shaft extending from the first permanent magnet unit.

8. The hand truck of claim 7 wherein the first shaft of the first permanent magnet unit comprises a distal end comprising a first linkage attachment mechanism and the second permanent magnet unit comprises a second shaft comprising a second linkage attachment mechanism and the linkage assembly connects the first linkage attachment mechanism to the second linkage attachment mechanism.

9. The hand truck of claim 8 wherein the first linkage attachment mechanism comprises a first sprocket, the second linkage attachment mechanism comprises a second sprocket, and the linkage assembly comprises a chain.

10. The hand truck of claim 6 further comprising a caster wheel attachment plate comprising extending backwardly from the hand truck.

11. The hand truck of claim 10 further comprising a left-side caster wheel attached to a left side of the caster wheel attachment plate and a right-side caster wheel attached to a right side of the caster wheel attachment plate.

12. The hand truck of claim 6 wherein the left-side rail member and the right-side rail member each comprise a ground engaging foot member.

* * * * *